United States Patent [19]
Clark et al.

[11] Patent Number: 5,970,064
[45] Date of Patent: Oct. 19, 1999

[54] REAL TIME CONTROL ARCHITECTURE FOR ADMISSION CONTROL IN COMMUNICATIONS NETWORK

[75] Inventors: Timothy Ian James Clark, Sawbridgeworth, United Kingdom; Anthony Richard Phillip White, Ottawa, Canada

[73] Assignee: Northern Telecom Limited, Montreal, Canada

[21] Appl. No.: 08/873,497

[22] Filed: Jun. 12, 1997

[51] Int. Cl.[6] .............................. H04I 15/00; H04I 12/28
[52] U.S. Cl. .................. 370/351; 370/242; 370/244; 370/245; 370/351; 395/600; 395/800; 395/200; 395/650
[58] Field of Search .................... 370/242, 244, 370/254, 255, 230, 236, 351, 400, 234, 388, 401, 410, 224; 395/600, 200.15, 200.79, 800, 650, 575, 309

[56] References Cited

U.S. PATENT DOCUMENTS 5,014,262  5/1991  Harshavardhana ................. 370/16
5,463,777  10/1995  Bialkowski et al. ................. 395/5
5,604,729  2/1997  Aoki et al. ................. 370/224
5,701,416  12/1997  Thorson et al. ................. 395/200.15
5,790,548  8/1998  Sistanizadeh et al. ................. 370/401
5,854,903  12/1998  Morrison et al. ................. 395/200.79

Primary Examiner—Michael Horabik
Assistant Examiner—Man Phan
Attorney, Agent, or Firm—Lee, Mann, Smith, McWilliams, Sweeney & Ohlson

[57] ABSTRACT

A communications network comprising N node elements operates N decision tables for controlling admission and control of data communications to the N node elements (FIG. 2). The performance of the network is optimised with respect to admission and control of commission data. Each node element generates corresponding performance data (FIG. 5), and the N decision tables and N performance data are collected at a central network controller. The network controller determines a set of new decision tables from the collected decision tables (FIG. 10) and distributes a new set of decision tables to each of the N node elements, which then proceed to operate the new decision tables throughout the network.

13 Claims, 18 Drawing Sheets

|  | Load | | | |
|---|---|---|---|---|
| Service Type | | $L_0$ | $L_1$ | $L_{max}$ |
| ST1 | | $t_{10}$ | $t_{11}$ ------------ | $t_{1m}$ |
| ST2 | | $t_{20}$ | $t_{21}$ ------------ | $t_{2m}$ |
| ST3 | | $t_{30}$ | $t_{31}$ ------------ | $t_{3m}$ |
| ⋮ | | ⋮ | ⋮ | ⋮ |
| STn | | $t_{n0}$ | $t_{n1}$ ------------ | $t_{nm}$ |

Fig. 5

|  | Load | | | | |
|---|---|---|---|---|---|
| | $L_0$ | | | $L_{MAX}$ | |
| | A 1 | D 0 | | A 1 | D 0 |
| ST1 | $P^A_{10}$ | $P^D_{10}$ | ------------ | $P^A_{1m}$ | $P^D_{1m}$ |
| ST2 | $P^A_{20}$ | $P^D_{20}$ | | $P^A_{2m}$ | $P^D_{2m}$ |
| ⋮ | ⋮ | ⋮ | | ⋮ | ⋮ |
| STn | $P^A_{n0}$ | $P^D_{n0}$ | ------------ | $P^A_{nm}$ | $P^D_{nm}$ |

Fig. 6

String

Switch 1

| $t_{11}$ | $t_{12}$ | $t_{13}$ | --- | $t_{1n}$ | $t_{21}$ | $t_{22}$ | --- | $t_{2n}$ | --- | $t_{n1}$ | $t_{n2}$ | --- | $t_{nm}$ |

Switch 2

| $t_{11}$ | $t_{12}$ | $t_{13}$ | --- | $t_{1n}$ | $t_{21}$ | $t_{22}$ | --- | $t_{2n}$ | --- | $t_{n1}$ | $t_{n2}$ | --- | $t_{nm}$ |

Switch 3

| $t_{11}$ | $t_{12}$ | $t_{13}$ | --- | $t_{1n}$ | $t_{21}$ | $t_{22}$ | --- | $t_{2n}$ | --- | $t_{n1}$ | $t_{n2}$ | --- | $t_{nm}$ |

Switch 4

| $t_{11}$ | $t_{12}$ | $t_{13}$ | --- | $t_{1n}$ | $t_{21}$ | $t_{22}$ | --- | $t_{2n}$ | --- | $t_{n1}$ | $t_{n2}$ | --- | $t_{nm}$ |

Switch 5

| $t_{11}$ | $t_{12}$ | $t_{13}$ | --- | $t_{1n}$ | $t_{21}$ | $t_{22}$ | --- | $t_{2n}$ | --- | $t_{n1}$ | $t_{n2}$ | --- | $t_{nm}$ |

Fig. 16

REAL TIME CONTROL ARCHITECTURE FOR ADMISSION CONTROL IN COMMUNICATIONS NETWORK

FIELD OF THE INVENTION

The present invention relates to the field of communications networks, and particularly, although not exclusively, to telecommunications networks.

INTRODUCTION

A conventional communications network comprises a plurality of nodes at which are provided node devices, for example, switches or cross-connects in a broadband telecommunications network, computers in a TCP/IP network, or base stations in a wireless network, and linking the plurality of nodes a plurality of links which carry communications data signals between the nodes, the links comprising fiber optic links, copper wire links, wireless links or satellite links. Users of communications apparatus, eg faxes, modems, telephone handsets, video equipment, personal computers etc, access the network through the node equipment.

The control of communications connections across a conventional communications network is highly complex. In a multi-service environment in which different data types each having different data rates are required to be transmitted over the network, connections can be made on a point to point basis between two end users of the network, for example a telephone call between first and second users, or connections can be made point to multi-point between a service provider and a multiplicity of end users, for example the transmission of cable television programs over a network to a plurality of end users, or connections can be made multi-point to multi-point, for example a video conference call involving end users at three or more geographical locations.

Conventional communications networks use two basic methods for implementing communications across the network. Firstly, in circuit switched networks, a route and a fixed amount of bandwidth are allocated to a connection during a circuit set-up phase. Transmitted communications information appears at a destination node after a substantially fixed time delay. On the other hand, packet switched networks do not dedicate bandwidth to connections, but employ a form of distributed dynamic time division multiplexing in which discrete packets of information offered to the network are routed through a network of packet switching exchanges on a store and forward basis. The end to end delay of packets between a particular source node and destination node is variable, and influenced by the amount of traffic offered to the network. In both these basic types of network, routing policies which determine the route that the circuits or packets take through the network have a direct influence on the quality of service of the communication perceived by users of the network. In the case of circuit switching, poor routing decisions result in call blocking, ie the denial of a requested connection. In the case of packet switched networks, poor routing decisions lead to unacceptable packet delays and reduced communications data traffic throughput across the network due to congestion. Referring to FIG. 1 herein, there is shown a prior art communications network of the circuit switching type. The network comprises a plurality of nodes 100–104 each comprising a node device, for example a switch, the nodes linked by a plurality of links 105–110, carrying communications data traffic between the nodes. Each switch is configured to accept communications connections across the network from users attached to the switch, in accordance with a routing policy data stored locally in the switch. Each switch generates data concerning its own performance, and has a knowledge of its own capacity. The network of switches is configured by a network controller 111, by means of which the amount of information that each switch has about its neighboring switches switching capacity is defined. For example the network can be configured such that each switch has knowledge of congestion on its nearest neighbor switches, or as an alternative example, each switch can be configured such that it has knowledge of its nearest neighboring switches and its next but one nearest neighboring switches. The transmission resources comprising the node elements and link elements have finite data transmission capacity, and the demand for transmission resources by end users is variable in its nature and difficult to predict. Further, as a network is expanded or reconfigured to deal with increased usage by customers, new node elements and link elements may be added to an existing network.

It is inevitable that due to the high data carrying demands placed on a communications network, there will be times when communications data is lost due to overloading of transmission resources, and there will be times at which communications connections cannot be made due to unavailability of transmission capacity at node elements or link elements.

SUMMARY OF THE INVENTION

Preferred embodiments, methods and processes according to the present invention aim to provide a control method and apparatus for controlling admission of communications connection to a communications network comprising a plurality of nodes and links, which optimizes utilization of transmission resources within the network.

It is another object of preferred embodiments and methods according to the present invention to provide a control method and apparatus for admitting communications connections to the communications network, which is re-configurable within a relatively short time scale.

It is yet another object of specific methods, processes and apparatus according to the present invention to provide a control method and apparatus for admitting communications connections to a communications network, in which the operation of the network as a whole is optimized.

According to a first aspect of the present invention there is provided a method of controlling admission of communication signal data over a communications network comprising a plurality of node elements linked by a plurality of link elements, said method comprising the steps of:

collecting a plurality of admission control policy data each relating to an admission control policy for admitting communications traffic data to a said node element;

determining a new admission control policy data from said plurality of collected current admission control policy data; and operating said new admission control policy data at said plurality of node elements.

Preferably said collected plurality of admission control policy data includes current admission control policy data currently operated by at least one said node element.

Preferably the method further comprises the steps of:

collecting a plurality of performance data, each relating to a performance of a respective node element; and determining said new admission control policy data from said plurality of collected performance data.

Preferably said collected plurality of performance data includes current performance data relating to a current operation of a said node element.

Preferably said step of determining a new admission control policy data comprises generating a simulated performance data from said new admission control policy data.

Preferably said step of operating said new admission control policy data at each of said plurality of node elements comprises:

at each node element;

comparing a current performance data describing a current performance of said node element with a predetermined performance data; and if said current performance data is worse than said predetermined performance data, operating a previous said admission control policy data.

Preferably said step of determining a new admission control policy data comprises:

representing said plurality of admission control policy data as input data to an optimization algorithm; and operating said optimization algorithm to optimize said input admission control policy data.

Said step of determining a new admission control policy data may comprise:

representing said plurality of admission control policy data as a population of data strings; and evolving said population of said data strings to produce a new population of data strings representing a new set of admission control policy data.

Preferably said step of operating a new admission control policy data at said plurality of node elements comprises operating said new admission control policy for a predetermined period.

According to a second aspect of the present invention, there is provided a communications network comprising:

a plurality of node elements and a plurality of link elements; and an admission control policy data generator for generating an admission control policy data for controlling admission of communications traffic data to the network, wherein each said node element admits input traffic data in accordance with an admission control policy data stored locally at said node element;

each said node element periodically transmits said admission control policy data to said admission control policy data generator; and said admission control policy data generator operates to generate a new admission control policy data depending on a plurality of said admission policy data received from said plurality of node elements.

Preferably said admission control policy data generator comprises:

a processor element for processing said admission control policy data, said processor element configured for operating to:

input a population of data strings corresponding to a population of admission control policy data;

evaluate said population of data strings;

select individual data strings of said population in accordance with a result of said evaluations; and evolve said selected data strings to create a new population of data strings corresponding to a new population of admission control policy data.

According to a third aspect of the present invention, there is provided a method of implementing transmission of communications signal data over a communications network comprising a plurality of node elements connected by a plurality of link elements, said method comprising the steps of:

admitting communications data to each node element in accordance with a set of admission control policy data;

generating a respective performance data at each node element, said performance data describing a performance of said node element;

collecting said performance data corresponding to a plurality of said node elements; and generating new admission control policy data depending on said collected performance data.

According to a fourth aspect of the present invention, there is provided a method of generating an admission control policy data for controlling transmission of communications traffic data over a communications network comprising a plurality of node elements linked by a plurality of link elements, said method comprising the steps of:

representing a plurality of admission control policy data as a population of data strings;

evolving said population of data strings by data processing operations selected from the set reproduction, cross-over, mutation, to obtain an evolved population of data strings;

generating a respective fitness data corresponding to each said string data; and selecting one or a plurality of data strings of said evolved population in accordance with said fitness data, said selected strings comprising a next generation population of data strings.

Preferably, said step of generating a fitness data comprises:

obtaining a respective admission control policy data corresponding to each said string data; and processing each said admission control policy data in accordance with a network simulation model data to obtain a respective simulated performance data corresponding to each said string data; and obtaining said fitness data from said simulated performance data.

Preferably the method comprises the steps of selecting an optimum set of string data based on a result of said fitness data;

for each string data of said optimum set, obtaining a respective admission control policy data resulting in a set of new admission control policy data;

transmitting said set of new admission control policy data to a plurality of node elements configured to operate in accordance with said admission control policy data;

generating a respective performance data at each node element, each said performance data describing a performance of said respective node element; and obtaining a said fitness data from said generated performance data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 5 illustrates schematically an admission control policy data in the form of a decision table of threshold values for accepting or denying service requests to a node element;

FIG. 6 illustrates schematically a set of status data describing performance or simulated performance of a node element;

FIG. 16 illustrates schematically sets of admission control policy data in a format operated on by the genetic algorithm process in the network controller;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
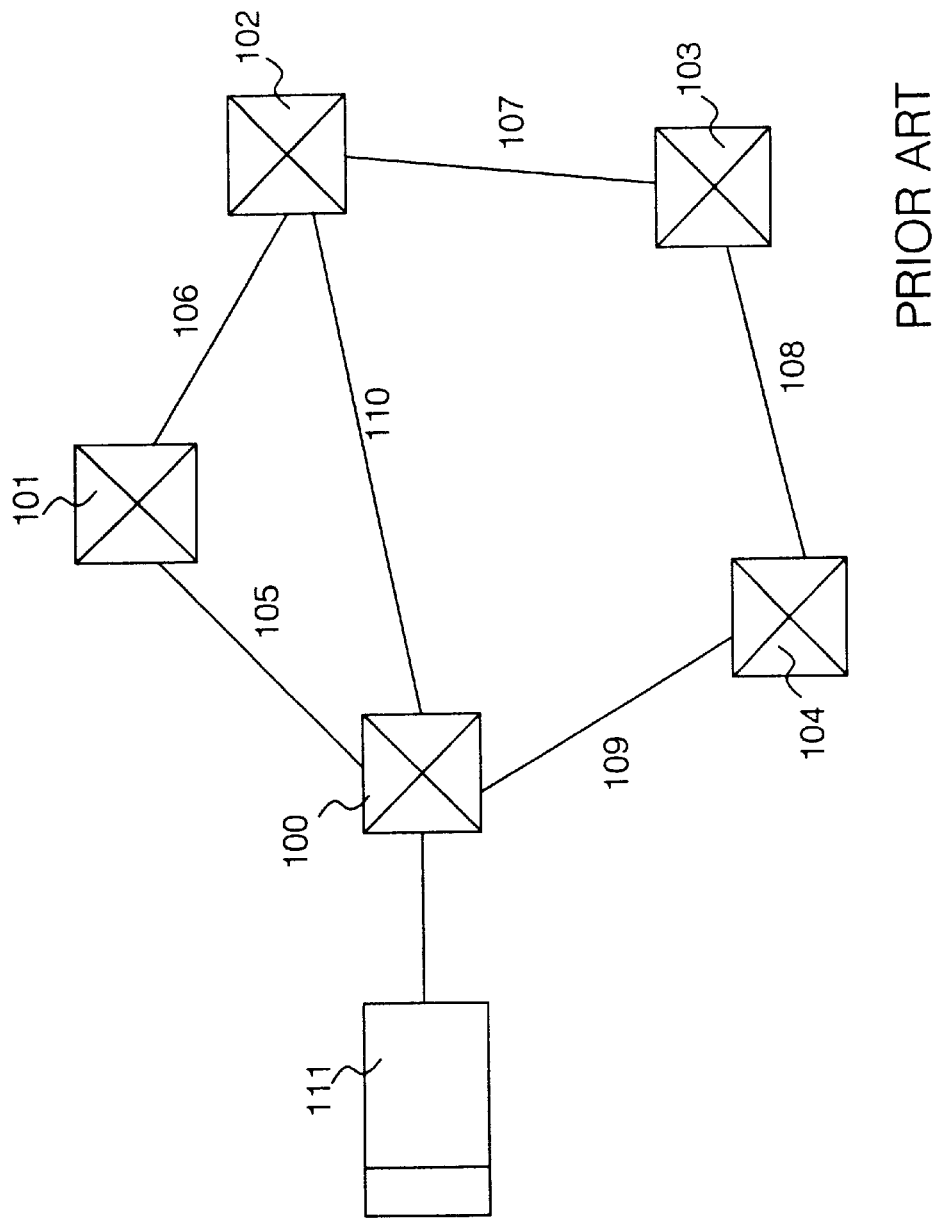
Figure 2:
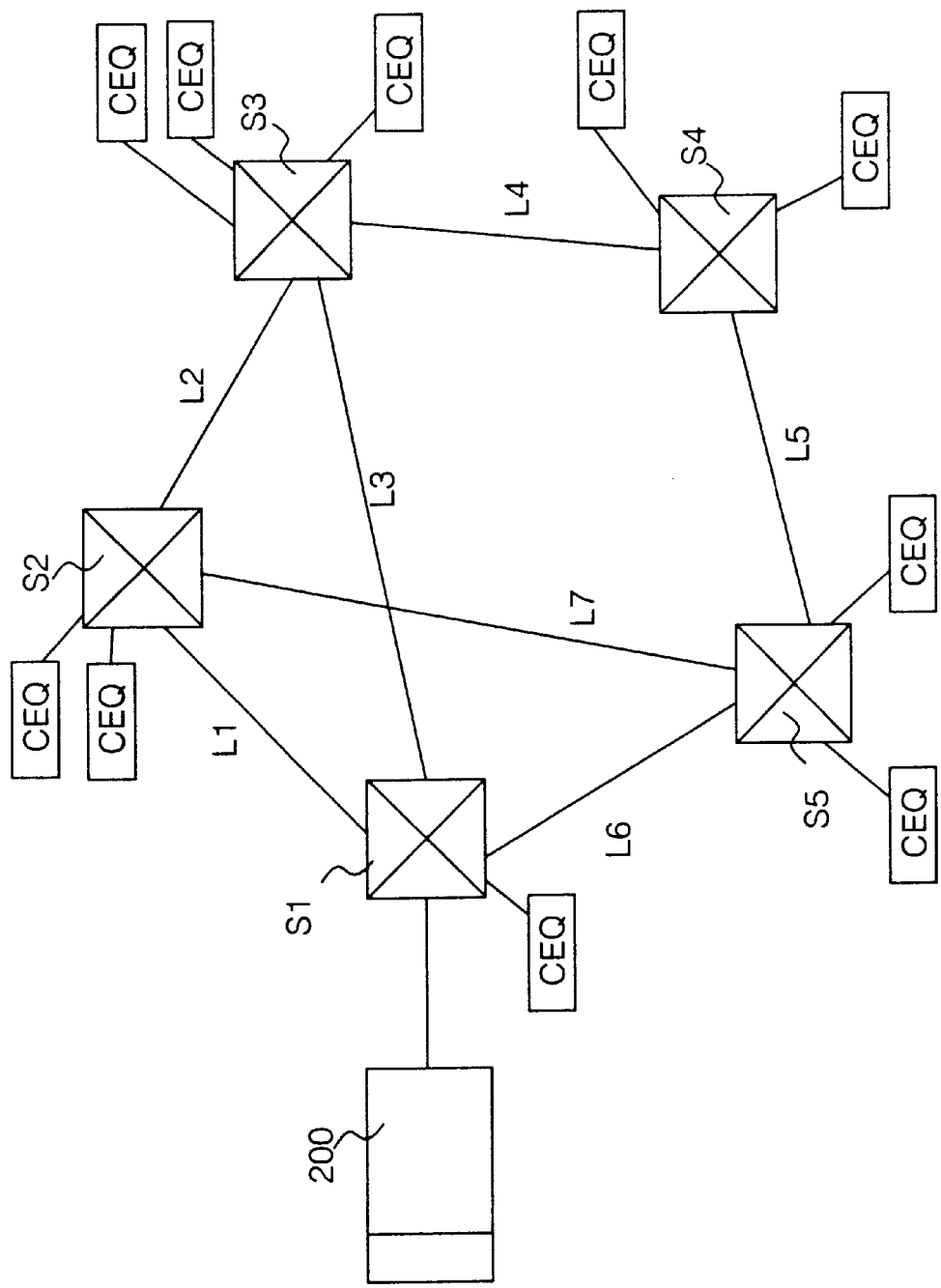
FIG. 2 illustrates schematically a communications network comprising a plurality of node elements and a plurality of link elements, the network controlled by a network controller performing a function of generating admission control policy data.
Figure 3:
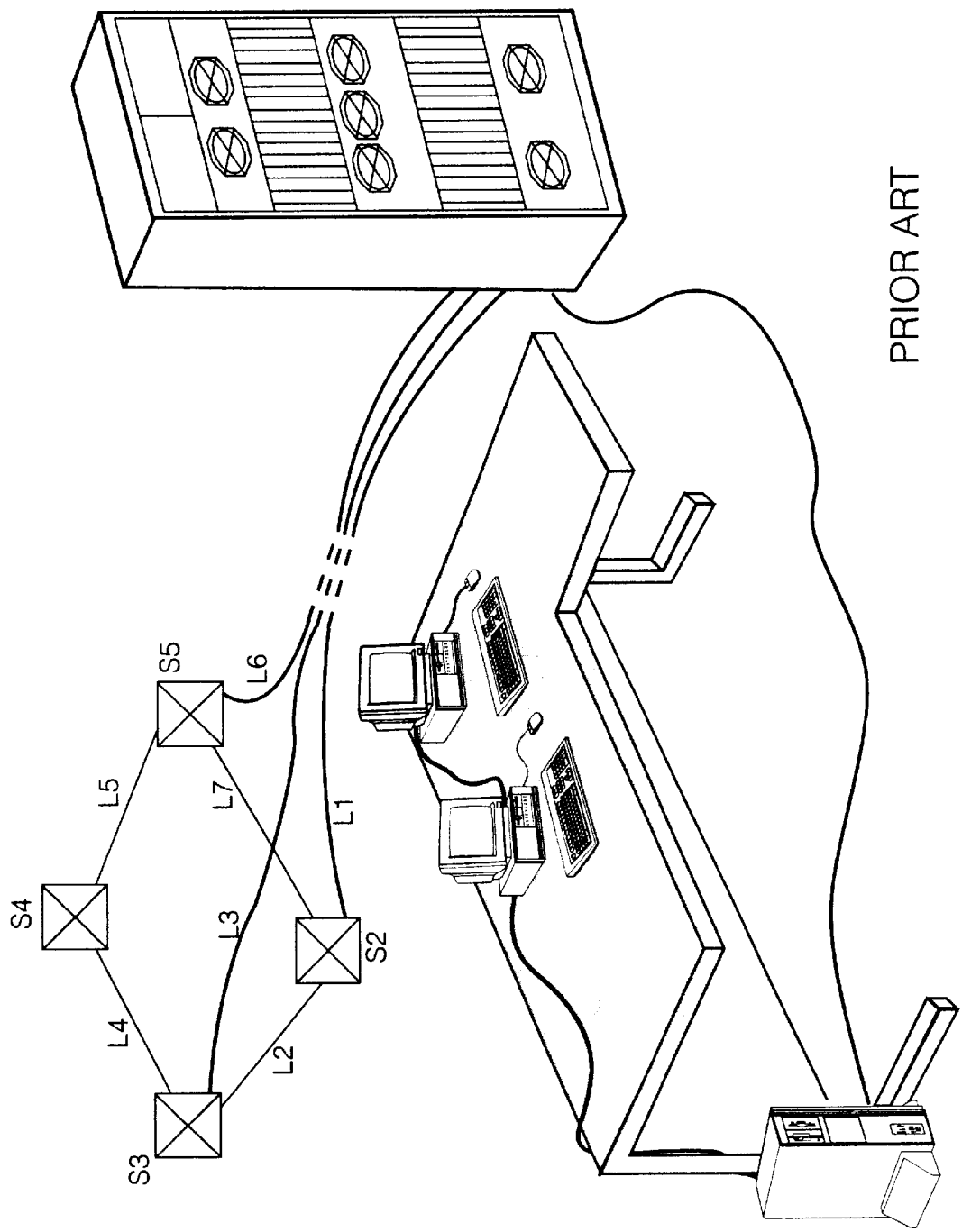
FIG. 3 illustrates a physical view of a node element and the network controller of FIG. 2.

Referring to FIGS. 2 and 3 herein, there is shown schematically a broadband telecommunications network of the asynchronous transfer mode (ATM) type having node devices comprising first to fifth switches S1–S5, the switches linked by a plurality of transmission links L1–L7 comprising link devices. Customer equipment devices (CEQ) each associated with a switch request connection of services across the network through the switch to which they are associated. The customer equipment may be any device capable of communicating across an ATM network, for example telephone handsets, fax machines, video apparatus, modems or the like. Connected with the network, for example via switch S1, is a network controller apparatus 200. The network controller apparatus may typically be for example a Hewlett Packard workstation having 128 megabytes of memory and 2 gigabits of hard disk storage space. As illustrated in FIG. 3 herein, the switch apparatus typically comprises an upright rack of height around 2.5 to 3.0 meters, containing a plurality of line cards containing buffers through which communications calls pass. A switch fabric device effects the actual switching of communications data signals generated by customer equipment.

The switches transmit cells of communications data signals to each other. Transmission of communications data between switches across the network is controlled by traffic control algorithms, congestion control algorithms, and quality of service algorithms which are incorporated into the ATM signaling mechanisms and flow control techniques found in the ATM standards, published by the International Telecommunications Union (ITU). Available from ITU Sales and Marketing Services, Place des Nations, CH-121, Geneva 20, Switzerland or from the ATM Forum, 2570 West El Comeno Real, Suite 304, Mountain View, Calif. C190404, USA. Where a customer wishes to communicate across the network, for example to make a voice telephone call, a customer equipment requests a source switch, eg switch S1 to set up a new connection across the network. The customer equipment first negotiates with the switch S1 by transfer of electronic signals, for the setting up of a connection. The customer equipment declares electronically the parameters for the connection, eg required peak cell rate, the required quality of service (QoS), the service type of data to be transmitted, and any other connection parameters needed. Within the switch is provided a connection admission control (CAC) element which determines whether sufficient transmission resources are available across the network to allow immediate connection of the customers requested connection. The connection admission control (CAC) element is implemented at the level of the individual switch by dedicated electronic hardware operating connection and admission algorithms which set up the connections across the ATM Network. Such algorithms operate in the ATM layer, or in the ATM adaptation layer (AAL) of the ATM standards. Connections between switches are controlled by signal cells transmitted between node elements. Such a signal cell carries a header data labeling the cell as being a cell of signaling information, and the data contents of the cell provide instructions for configuring the admission and connection elements of the node elements. Since the transmission of signaling cells across the ATM network utilizes bandwidth which could otherwise be used for higher level communication, ie user communications data, it is therefore desirable to keep transmission of signaling cells across the network to a minimum. If the connection admission control determines that sufficient transmission resources are available to satisfy a customer equipment request, then a connection is set up. If not, the customers connection request is rejected so that the quality of service provided to existing users of the network is not compromised. The quality of service offered by an ATM connection depends up the number of cells lost or discarded during the transmission.

In the best mode herein, each switch operates local control mechanisms for opportunistically selecting connection and admission control policies at a local switch level, whilst the network controller operates a centralized control mechanism improving the overall connection admission and control policies operated across the network at a strategic level, based on the results of currently implemented policies at each of the switches. Control of the connection and admission policies across the network is hybrid of control distributed across the network at the local switch level, and centralized control at the network controller.

Figure 4:
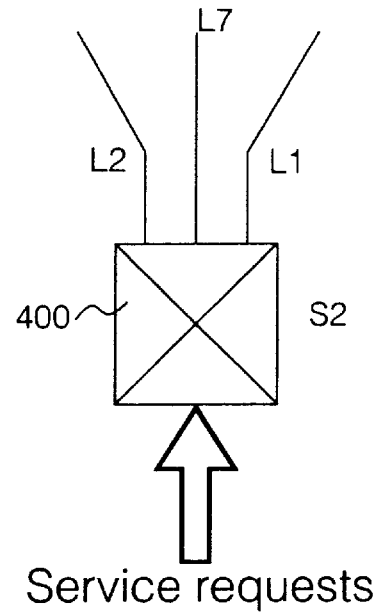
FIG. 4 illustrates schematically a node element of the network of FIG. 2 receiving a plurality of service requests from customer equipment.

Referring to FIG. 4 herein, there is illustrated conceptually an ATM switch device 400 receiving service requests from a customer equipment for transmission across the ATM broadband network over links L1, L2, L7. The service requests comprise cells containing data specifying connection parameters concerning the required connection. Such parameters may include:

An end point of the connection

A required bandwidth of the connection

The type of transmission required, eg variable bit rate, adaptive bit rate or constant bit rate A required connectivity, ie whether the connection is to be point to point, ie between two end points, point to multipoint, eg a broadcast from one source to many end users, or multipoint to multipoint, eg a video conference bet ween many users.

Data capable of comprising a service request are listed in Table 1, herein.

TABLE 1

Service Reguest Data

- Peak cell rate data
- Service type data
- QoS data
- End point data of connection
- Required bandwidth data
- Transmission Mode data eg    - variable bit rate (VBR)
                               - adaptive bit rate (ABR)
                               - constant bit rate (CBR)

The switch receives the service request data and compares the service request data with stored status data describing the status of the switch itself with respect to its transmission capacity. The switch 400 generates its own status data by generating signals describing performance parameters of the switch such as its loading; its cell discard, which describes the number of cells being lost in the switch due to congestion and from which quality of service may be determined; the cell rate through its buffers, describing the data rate and hence the utilization of its own circuitry; and the demand at the switch ie the call arrival rate of service requests at the switch. The switch may optionally receive information concerning the loading and congestion of neighboring switches through a system of advertisement signals, which are defined in the ATM standards, and therefore may have a knowledge of the status of neighboring switches.

The status data forms part of a knowledge base held by the switch. The knowledge base also contains admission control policy data concerning a switching policy for operating admissions and connections of the switch. The admission control policy data is stored electronically in the form of a set of decision table data. The policy data controls the admission control hardware of the switch. Each switch stores a number M of sets of decision table data, each corresponding to a separate admission control policy. Although each switch maintains a plurality of decision table data sets, only one set is actively operated at any one time, and only one policy is operated at a time. The switch selects the optimum decision table data from the plurality of stored sets. The policy data is input into connection algorithms and admission algorithms operated by the switch which implement in real time connections and admissions in accordance with the policies described by the selected active decision table. Additionally, the knowledge base of the switch includes service type data, describing the various types of service available over the network, eg 64 Kbits/sec voice connection, video connection, video conference connection, along with the bandwidths required to support those services; the peak cell rates required to support those services; and the transmission mode eg variable bit rate, statistical bit rate, adaptive bit rate, required to support those service types. Data comprising the knowledge base held at each switch is listed in Table 2, herein.

TABLE 2

| Switch Knowledge Base | | |
|---|---|---|
| Service Type Data | - 64 Kbit/s voice ) | bandwidth |
|  | - Video ) | peak cell rate |
|  | - Video conference ) | transmission mode |
|  | - Other ) | -SBR |
|  |  | -ABR |
|  |  | -CBR |
| Status Data |  | Policy Data |
| - Loading data |  | - Decision table data |
| - Quality of Service (QoS) data |  | - Threshold data |
| - Cell discard data |  | - Service type data |
| - Buffer cell rate (utilization) data |  |  |
| - Demand (call arrival rate) data |  |  |

Referring to FIG. 5 herein, there is shown a representation of an admission control policy data. The admission control policy data comprises a decision table which determines whether the switch accepts or denies service requests. The decision table is stored as electronic or magnetic signals on a computer readable storage means, eg a hard disk drive or volatile memory in the form of bits of information. The data shown in FIG. 5 herein represents the information content of those bits of data, and is shown in tabular form for ease of description.

In FIG. 5, in a first column there are described types of data which can be specified in a service request from a user. For example, a service type data ST1 may relate to voice data at 64 Kbits per second, a service type data ST2 may relate to compressed video data at 5.3 Megabits per second and so on for N types of data. A traffic descriptor in the call setup request is mapped to one of the service types known to the switch and service type specification is performed by a user when switches are configured. A horizontal axis in FIG. 5 represents a load on the switch in terms of load increments between zero load $L_0$ and a maximum load $L_{max}$, measured in units of cells per second. For each service type, at each value of load there is stored a cut-off threshold value t, being a Boolean value, 0 or 1 which determines whether the requested service type can be admitted through the switch or not. The load in cells per second may relate to the load of the switch as a whole, which may be determined from a summation of the individual loads on individual line cards in the switch. Certain types of switch may only support generation of information concerning the load on the switch as a whole, whereas other types of switch, for example the Concorde® type switch available from Northern Telecom Limited may support information concerning the individual loads on individual line cards in the switch.

A decision on whether to admit or deny connection of a service request is taken by the switch in real time in accordance with the currently active decision table of FIG. 5. For example, if the switch is operating at maximum load, for service type ST2 where ST2 represents video conferencing data, it is likely that the threshold $t_{2m}$ will be a 0, ie indicating that at maximum load the switch will deny new video conferencing connections.

In addition to the decision table of FIG. 5, the switch also generates a quality of service data representing the quality of service (QoS) currently offered by the switch implementing the currently active admission control policy and historical quality of service data offered by the switch when implementing previous connection policy decisions embedded in the knowledge base of the switch. The quality of service data is represented schematically in tabular form in FIG. 6. The quality of service data is stored electronically, as is the policy data. In a vertical axis of FIG. 6, there is represented the service types ST1, ST2 ... STn, and across a horizontal axis there is represented the load in terms of load increments of between zero load $L_0$ and the maximum load $L_{max}$ measured in cells per second through the switch. The load in FIG. 6 corresponds to the load in FIG. 5. For each service type, at each value of load there is generated a quality of service data representing the quality of service obtained in the case of accepting or denying a service request for data of that service type. The quality of service data comprises a probability P of call blocking, the probability having a value in the range 0 to 1. For example, where threshold $t_{10}$ is 1, ie for a zero load and data of service type ST1, since $t_{10}$ is set at 1, a service request for data of type ST1 will be accepted. In FIG. 6, a quality of service data $P_{10}^A$ having a value of between 0 and 1 gives a probability of call blocking occurring where the switch is initially on zero load, and data of service type ST1 is accepted at the switch. Where the switch is on zero load initially, if data of service type 1 is of low data rate, then it is likely that the probability of call blocking $P_{10}^A$ where the service request is accepted will be low, or in other words a relatively high quality of service will be provided. Similarly, where the threshold $t_{11}$ is set at 0 for an initial load of zero and where request connect data of service type ST1 are denied, then a different probability of call blocking $P_{10}^D$ may occur at the switch.

Similarly, where service type ST1 is requested and the switch is operating at the maximum load, if the threshold $t_{1m}$ corresponding to that load and service type is 0, ie requests are denied, the corresponding error probability $P_{1m}^D$ may be lower than a call blocking error probability $P_{1m}^A$ for the case if the threshold is set at 1, for accepting service requests for data of type ST1.

Figure 7:
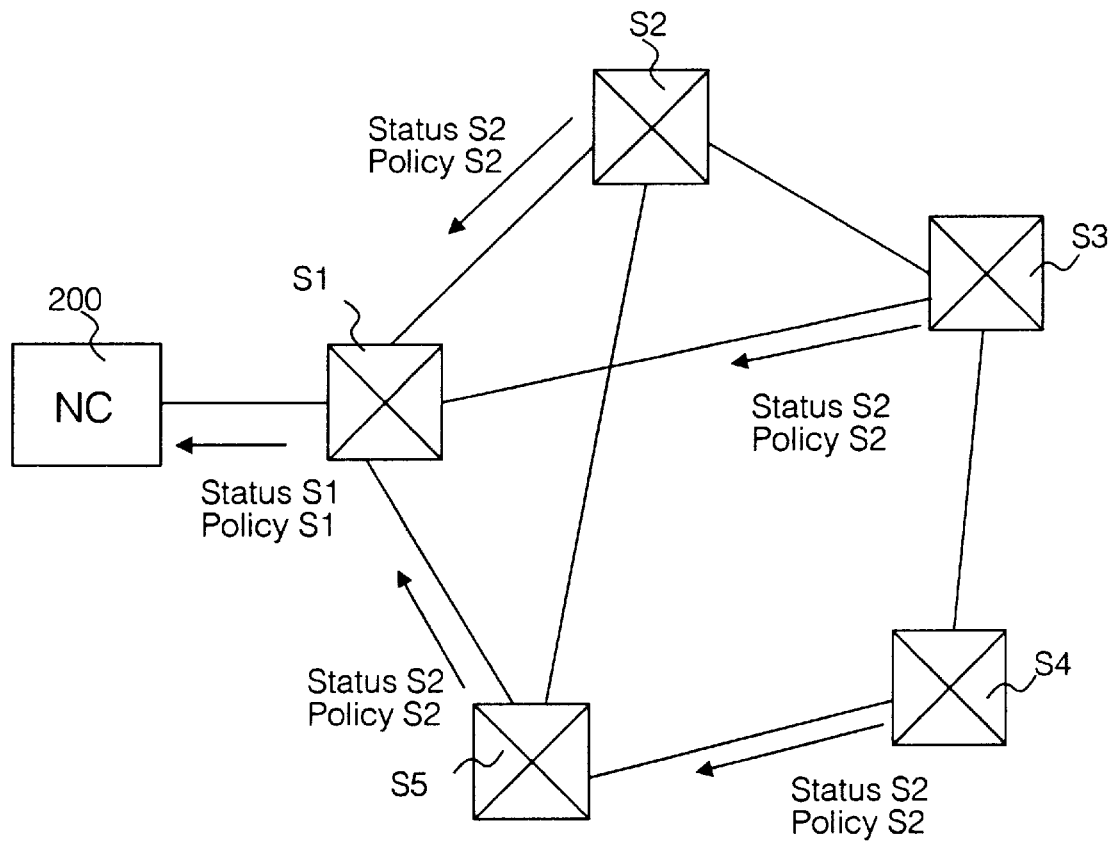
FIG. 7 illustrates schematically transmission of admission policy data and status data from the plurality of node elements to the network controller, and collection of the admission control policy data and status data at the network controller.

Referring to FIG. 7 herein there is illustrated reporting of currently active policy data and corresponding status data from the switches to the network controller. Each of the plurality of switches S1–S5 has its own knowledge base, storing its own current decision table data from which current admission policy decisions are currently implemented, and generates its own set of current status data representing the current performance of the switch operating in accordance with its current active admission policy decisions. The switch is configured to operate the active decision table for a predetermined operating period, which can be set at the switch, or which can be set by the network controller 200 centrally for all switches, or for individual switches in the network. The predetermined operating period may be a time period or a period taken to implement a preset number of connection decisions. During operation of the switch under control of the current active decision table, the corresponding status data is updated periodically, or in real time, at the switch for example as the appropriate signals become available through normal operation of the switch. The knowledge base of each switch comprises the other sets of decision tables which are not currently being implemented, some of which may have previously been implemented during previous periods and some of which have not been implemented by the switch. For decision tables which have been previously implemented by the switch, corresponding status data resulting from implementation of those decision tables is stored on the knowledge base of the switch.

Each switch has local control over the selection of the decision table which it operates. The switch may select any one of its M stored decision tables under control of a local selection algorithm operated by the switch. The algorithm is preferably configured to select one of the M decision table data on the basis of favoring the decision table data which results or is likely to result in the best quality of service data. The switch is set to operate its currently selected decision table data for the predetermined operating period which is long enough to collect status data resulting from the operation of the decision table which is statistically meaningful. If the status data and in particular, the quality of service data generated by the switch shows a serious degradation of quality of service on using a newly active decision table data, the switch can over-ride that decision table data before the end of the predetermined operating period, and replace it with an alternative decision table selected from the locally stored set of M decision tables. The set of M decision tables are periodically replenished by receipt of new decision table data from the network controller. Each switch only stores a limited number M of decision tables and the newly received decision table data from the network controller replaces the currently stored decision data table of the M stored decision tables which produces the worst quality of service data.

As illustrated in FIG. 7, the current admission control policy data and corresponding current status data representing quality of service of each switch are transmitted at regular intervals to the network controller 200. The regular intervals for transmission may be preset at the network controller. For example, the network controller may interrogate all the switches every regular preset transmission interval to collect current policy data and current status data from all the switches. Alternatively, the switches may be configured to transmit their currently operating policy data and corresponding status data to the network controller as and when the status data becomes available through normal internal data dumps operating in the switch, or whenever there is a change in the current status data or current policy data at a particular switch. The current policy data and corresponding respective current status data, for each of switches S1–S5 are sent to the network controller 200 which collects the data.

Each switch admits communications data traffic in accordance with admission control policy data stored locally at the switch. The network controller generates admission control policy data for controlling admission of traffic data generally onto the network at each of the switches depending on the plurality of admission control policy data received from the switches. The switches each transmit their current admission policy data to the network controller.

Figure 8:
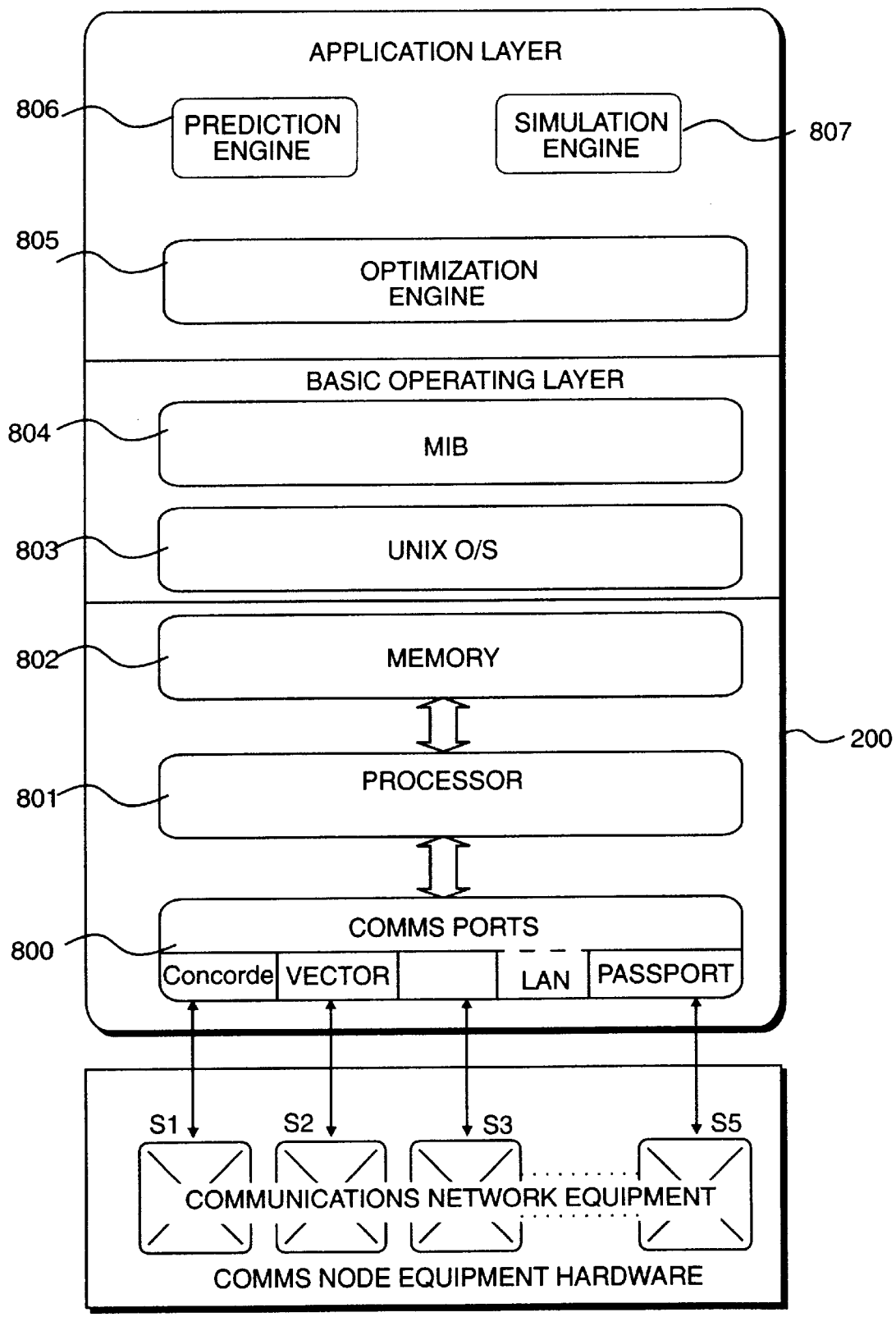
FIG. 8 illustrates schematically an internal architecture of the network controller, configured for implementing specific methods and processes according to the present invention.

Referring to FIG. 8, there is shown schematically a layout of a network controller device 200 capable of implementing specific methods of the present invention. An example of such a network controller is the known Concorde® Network Manager available from Northern Telecom Limited. The network controller receives the current policy data and current status data from the switches through communications ports 800 which may be configured for accepting signals from different types of switch, for example the Concorde®, Vector® or Passport®, asynchronous transfer mode switches available from Northern Telecom Limited, via the network control signaling facilities defined in the ATM standards. Hardware elements of the controller 200 comprise the communications ports 800; a processor 801 and associated memory 802; and a graphical user interface (GUI) which may include a video monitor, a keyboard for entry of data, a pointing device eg a mouse, one or more printing devices; and one or more data storage devices, eg hard disk drives having storage capabilities of Gbits of data. The controller operates in accordance with an operating system, for example the known UNIX operating system 803, to store the received current policy data and corresponding current status data for each switch in a management information base 804 comprising the data storage devices. Control signals for operating the network controller are stored in the form of applications programs comprising an optimization engine 805 operating a genetic algorithm optimization application 805, a prediction engine application 806, and a simulation engine application 807. The applications comprise control signals stored in a data storage device or other computer readable medium in the network controller, and arranged to operate the processor to process data and issue control signals to the switches in the network for operating those switches. Each of the prediction engine, genetic algorithm engine and simulation engine comprise the processor 801 of the network controller operated in accordance with control signals stored in the memory or database of the network controller. The control signals operate to process the policy data and status data, each also represented in terms of electronic signals passing through the electronic processor 801 of the network controller, the processor producing output data also in the form of electronic signals which may then be transmitted to the node devices, ie switches of the network as data in cells of data signals transmitted across the network in accordance with the ATM signaling standards.

Figure 9:
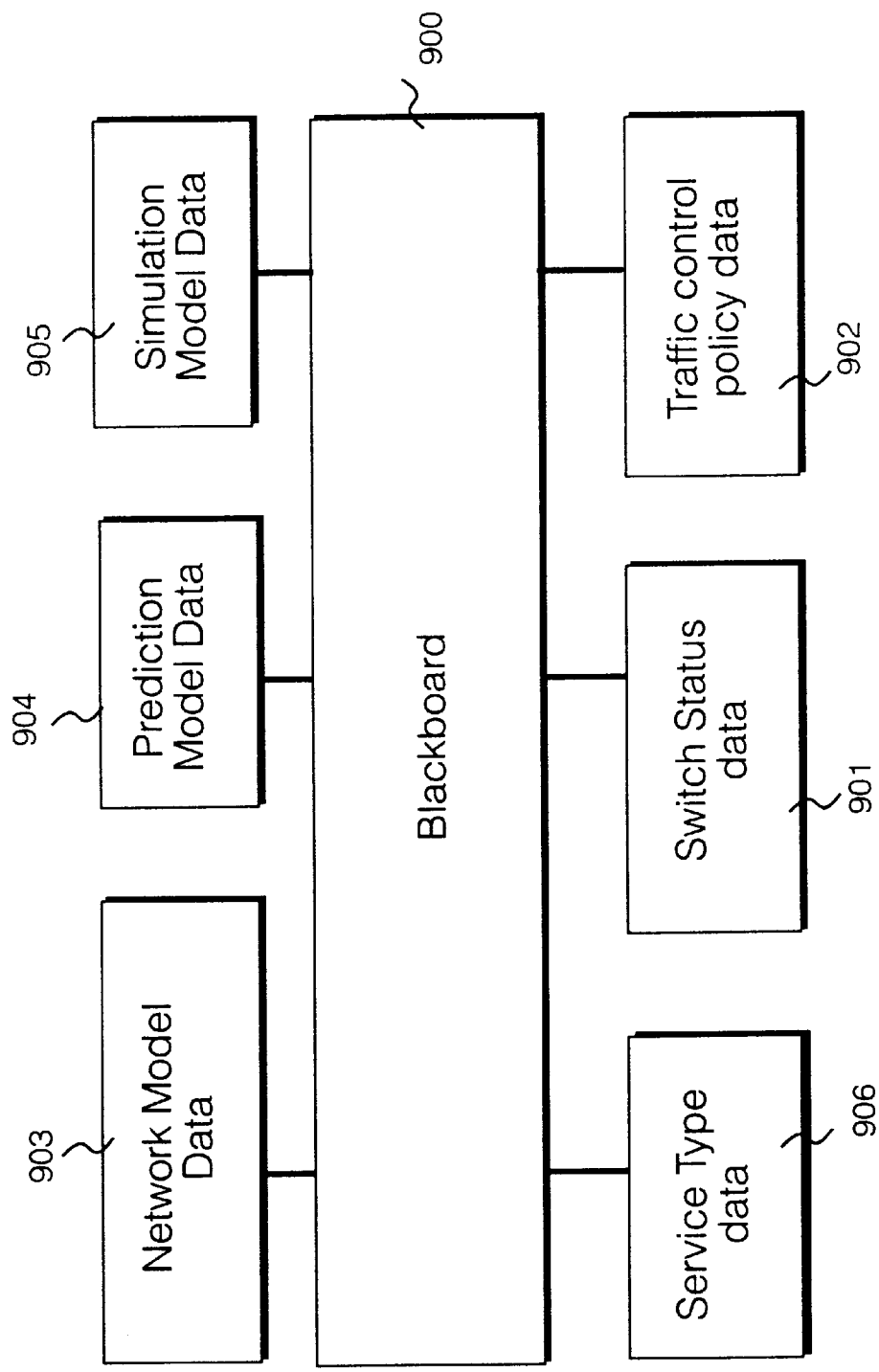
FIG. 9 illustrates a further internal architecture of the network controller.

The management information base 804, operates in accordance with a blackboard architecture in which data is posted in a common memory area 900 accessible by the applications. Referring to FIG. 9 there is illustrated schematically the blackboard architecture of the network controller. The current policy data and current status data received from each switch is available for interrogation by the genetic algorithm engine, prediction engine and simulation engine through the blackboard architecture. In addition to the status data 901 and policy data 902, the applications 805–807 can also access further data supporting those applications, through the blackboard architecture. For example the prediction engine 806 and simulation engine 807 access a network model data 903 describing the layout, connectivity, and other parameters of the network necessary for operation of the prediction and simulation engines. The prediction engine 806 has access to prediction model data 904, which may comprise for example curve fitting parameters or weighting parameters for input into prediction algorithms comprising the prediction engine. The simulation engine 807 may have access to simulation model data 905 comprising various parameters required by the simulation engine in order to operate. The prediction engine and simulation engine also have access to service type data 906, comprising parameters regarding the various types of communications traffic services which are available in the network, eg data rate, required bandwidth.

Figure 10:
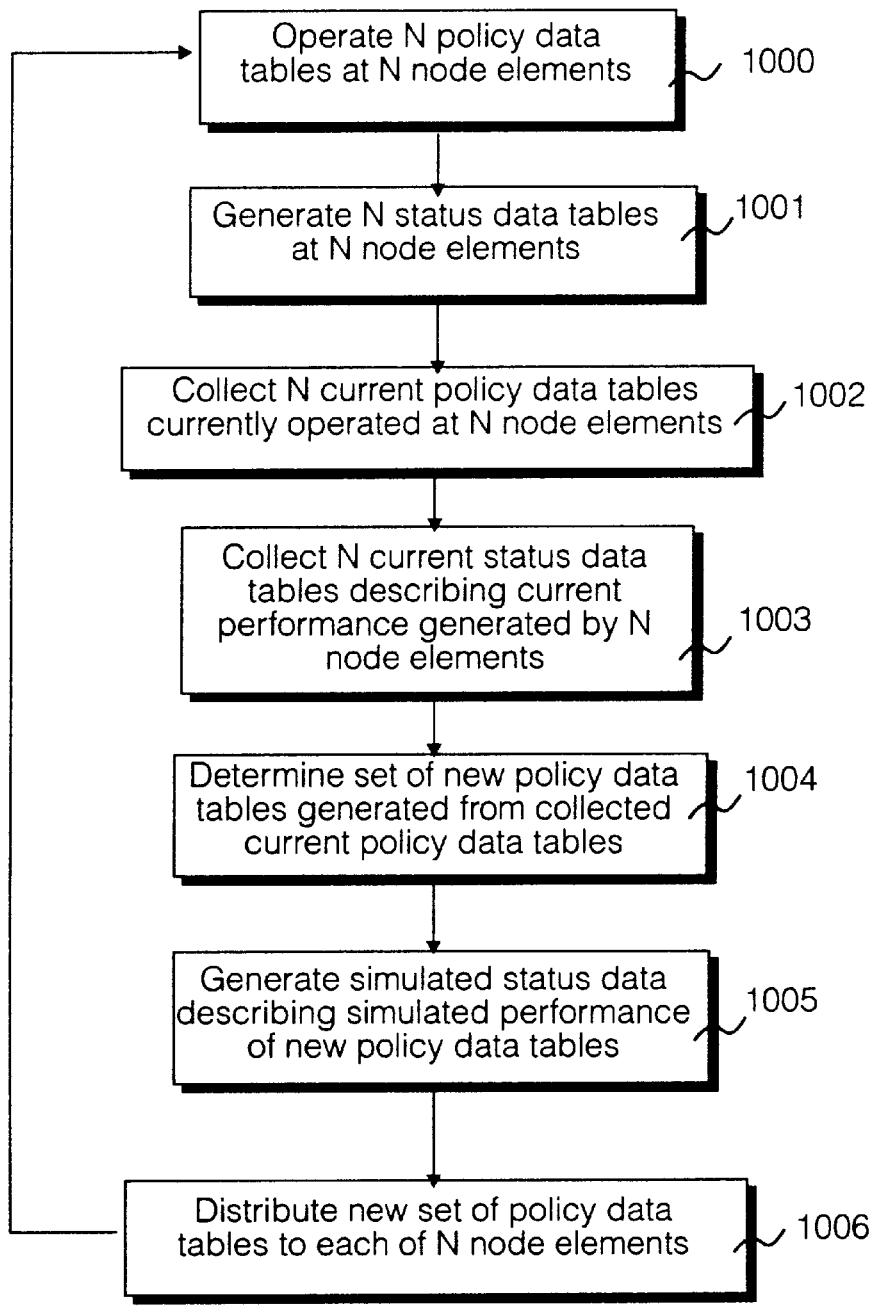
FIG. 10 illustrates schematically a general process according to the present invention for generating and optimizing admission control policy data for controlling admission of communications signal data to the plurality of node elements of the network.

Referring to FIG. 10 herein, there is shown a general overview of a process for improving the overall transmission of communications data over the network by optimizing and controlling the admission policies operated by each switch in the network. The process described with reference to FIG. 10 operates to collect information concerning the current admission policies operated by each switch in the network, and using information concerning the layout and configuration of the network and its node and link elements together with the current admission policies, produce an admission control policy data comprising a single decision table, or a set of policy data comprising a small number of decision tables for example five, which when implemented by the individual switches will produce optimized admission traffic control operation of the network as a whole. The single policy data or a policy data selected from the small set of policy data are operated by each switch of the network. In step 1000, the network, comprising N switches simultaneously operates N active decision data tables, one per switch. Of the N decision data tables operated at any one time, there may be duplication of policy data from switch to switch, ie some or all of the N decision data tables may be identical to each other. Each switch stores a number M of decision tables, and only one of those decision tables is operated at the switch at any one time. The switch selects which policy data to operate by comparing quality of service status data produced by the switch when operating under control of a particular policy data with of service data produced by the switch when operating under control of other ones of the M policy data stored in the switch. In step 1001, each switch generates a current status data in terms of a quality of service table as represented in FIG. 6 herein representing the current performance of that switch operating under its currently active policy. Thus, each switch operates its corresponding locally selected current policy data as represented in FIG. 5 herein, and generates its corresponding locally selected current quality of service performance data (status data) as represented in FIG. 6 herein at any one time, over the whole network. In step 1002, the switches each transmit their respective currently operating policy data to the network controller 200 which collects the N current decision tables of the N switches. The switches may transmit their policy data to the network controller substantially at the same time, or at separate times to each other. In step 1003, the switches may also transmit their current quality of service information representing their current status, along with the corresponding policy data decision tables, which are collected by the network controller. In step 1004, the network controller determines a new policy data from the collected current policy data received from the N switches. In step 1005 the network controller generates a simulated quality of service performance data (status data) describing performance which could be expected on the real network, if the new policy data were implemented in the real network, and uses this simulated performance data to select individual new policy data for sending out to the switches of the real network. In step 1006, having determined a new policy data table, or a set of new policy data tables, the network controller distributes the policy data table or new set of policy data tables to each of the N switches at the N nodes of the network. The switches each receive the newly generated policy data from the network controller and merge it with their set of M decision table data as described herein above, replacing one or more worst performing decision table data sets with the newly generated one or more decision table data sets.

Figure 11:
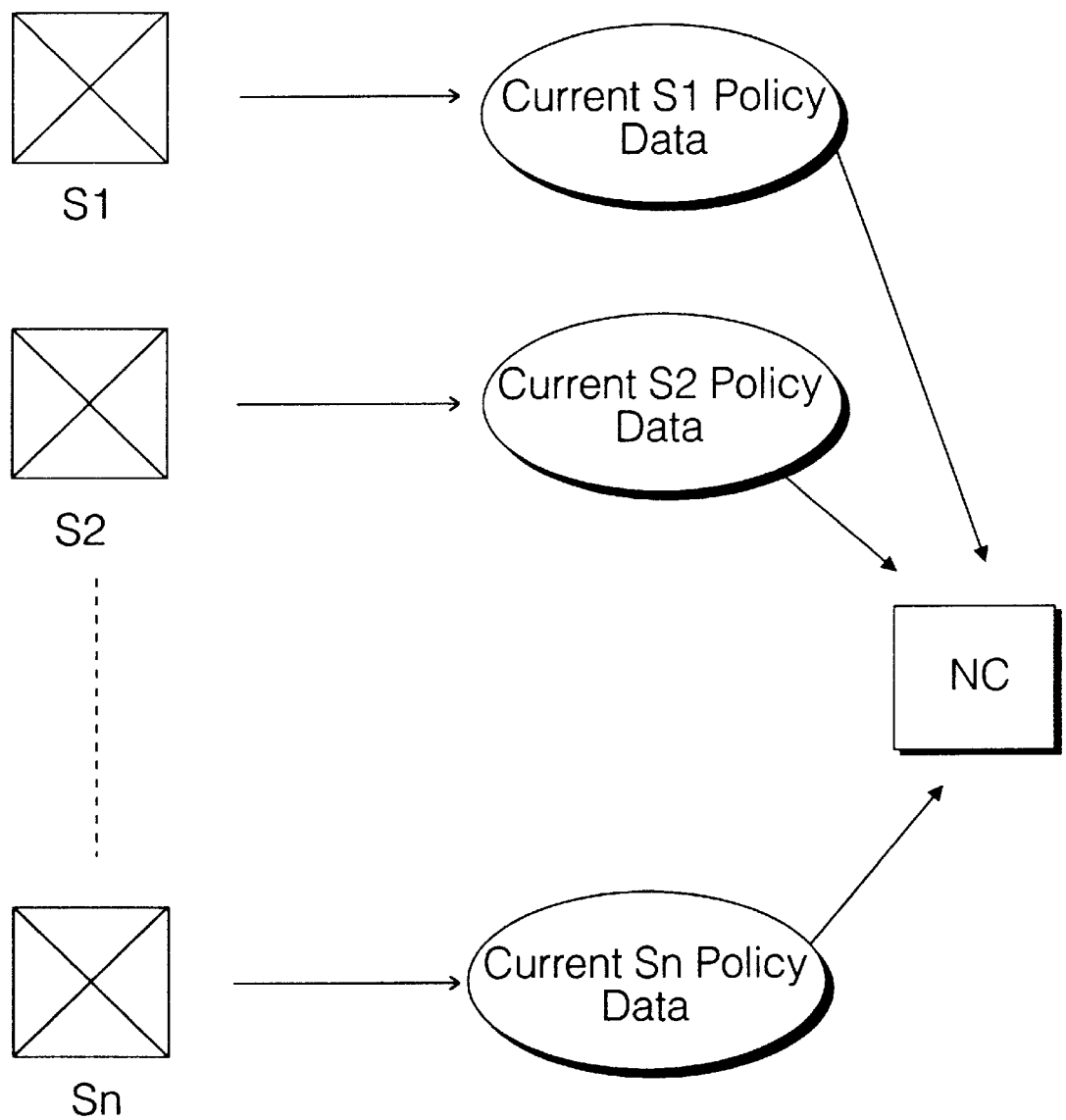
FIG. 11 illustrates schematically transmission of data from a plurality of switches comprising the node elements of the network, to the network controller.

Referring to FIG. 11 herein, there is illustrated schematically transmission of the currently operating policy data at each switch to the network controller. Switch S1 transmits its current policy data SP1 to the network controller. Switch S2 transmits its current policy data SP2 to the network controller, the current policy data SP2 may or may not be the same as the current policy data SP1, and so on for each of the N switches. The current policy data is transmitted over the network via the signaling mechanisms defined in the ATM standards. The decision tables of FIG. 5 are included as data in cells of data, the header portion of the data cell characterizing the data cells as being signaling information for operation of the network. The threshold values t comprising the policy data are transmitted serially as bits of information, ie Boolean values 0, 1. Referring to FIG. 5, the policy data are transmitted in the form of a string of data values, read from left to right and top to bottom.

Figure 12:
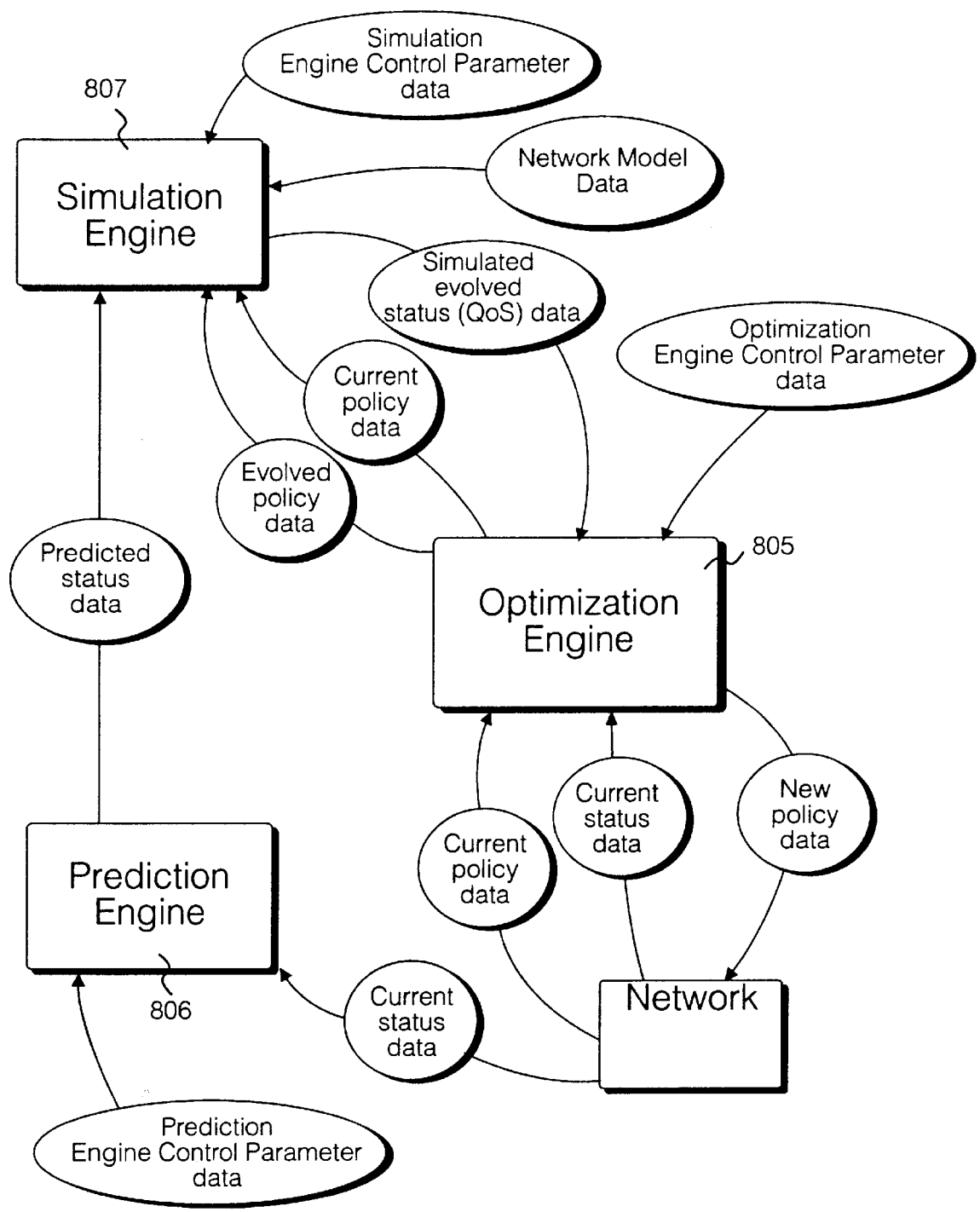
FIG. 12 illustrates schematically data flows between the network and the network controller, and between prediction, optimization, and simulation elements of the network controller.
Figure 13:
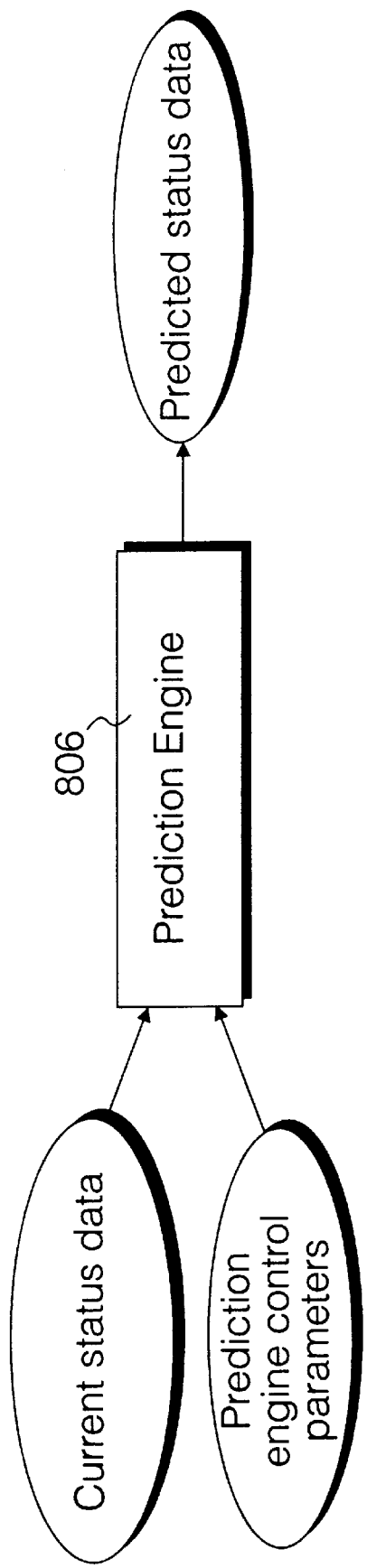
FIG. 13 illustrates data flows into and out of a prediction element of the network controller.

Referring to FIG. 12 herein, there is shown an interrelationship between the node devices of the network, and the applications in the network controller. Each switch transmits across the network, its current active policy data, optionally along with the corresponding current status data for each node device, to the network controller. This data is input into the optimization engine 805 which operates under control of optimization engine control parameter data. The optimization engine evaluates the received current policy data by inputting it into the simulation engine 807 operating according to simulation engine control parameter data and the network model data and then proceeds to evolve the policy data. The simulation engine simulates operation of the network using the evolved policy data and the current policy data and produces simulated status data, ie simulated quality of service data corresponding to the current or evolved policy data when applied to a model of the network as a whole. The simulated status data eg simulated quality of service data are returned to the genetic algorithm engine 805. The simulation engine 807 also receives predictions on future operation of the network from the prediction engine 806, in the form of predicted status data. The prediction engine 806 generates predicted status data based upon current status data and the input current policy data, as shown in FIG. 13. The status data may include service request parameters such as the input call demand, ie the rate at which calls are arriving at each switch, both currently and historically. The prediction engine is configured to predict future service request parameters, such as future call demand based on the current call demand and historical call demand at each of the switches and receives prediction engine control parameter data. This predicted status data is fed into the simulation engine 807.

Figure 14:
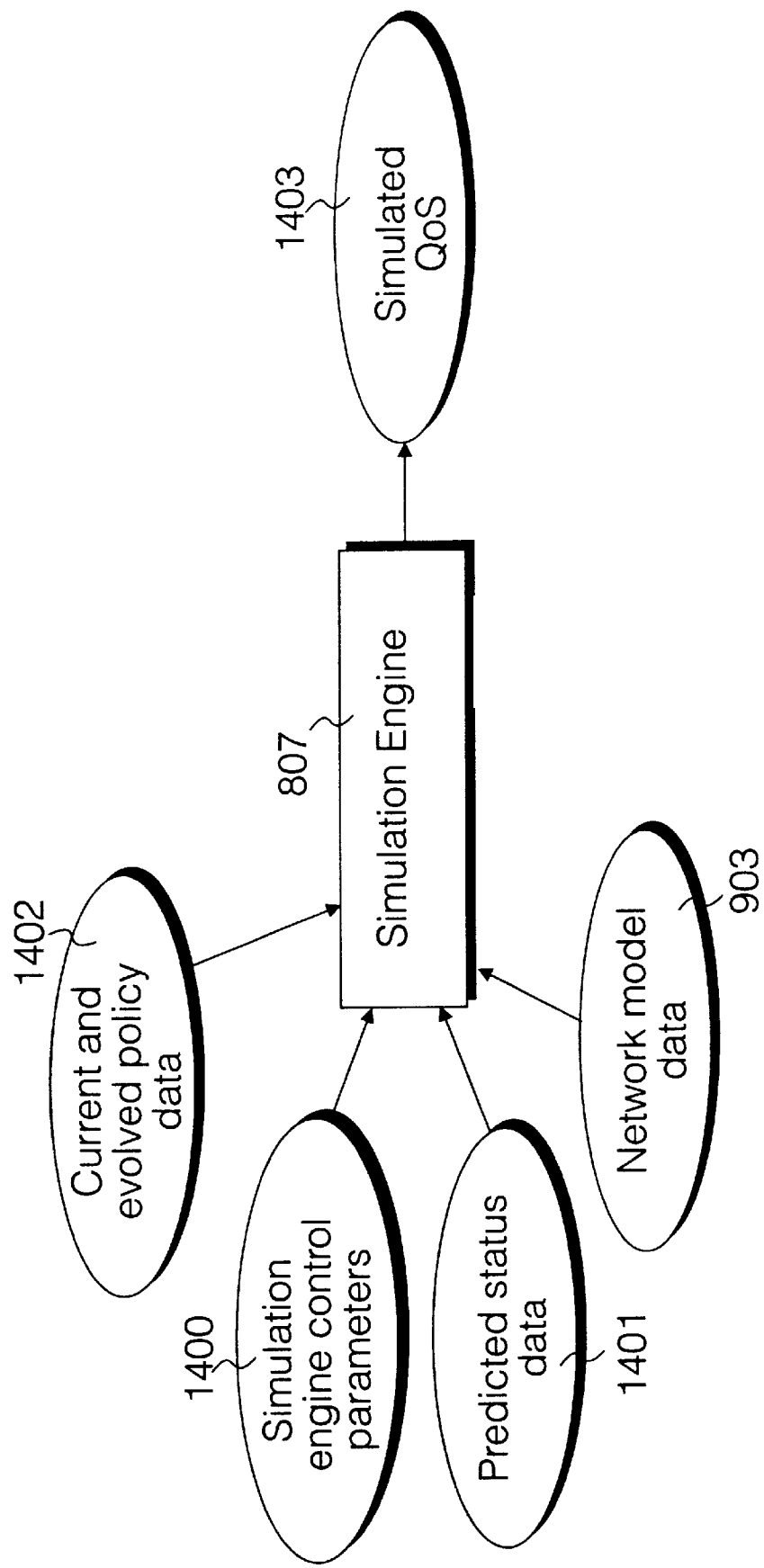
FIG. 14 illustrates data flows into and out of a simulation element of the network controller.

Referring to FIG. 14, the simulation engine 807 receives the network model data 903 from the management information base, the network model data describing the layout and connectivity of the network as a whole; simulation engine control parameter data 1400 from the network controller describing current parameters of network elements eg current path utilization, current call demand at present at each switch; predicted status data 1401 from the prediction engine 806 describing predictions of status of the network, for example, predicted demand, predicted path utilization and the evolved policy data and current policy data 1402 from the optimization engine 805. The simulation engine 807 outputs for each current policy data and each evolved policy data a simulated quality of service data 1403, as described later in this document.

The simulation engine 807 and prediction engine 806 operate as an evaluation step within a genetic algorithm process operated by the optimization engine, as described with reference to FIG. 15 herein.

Figure 15:
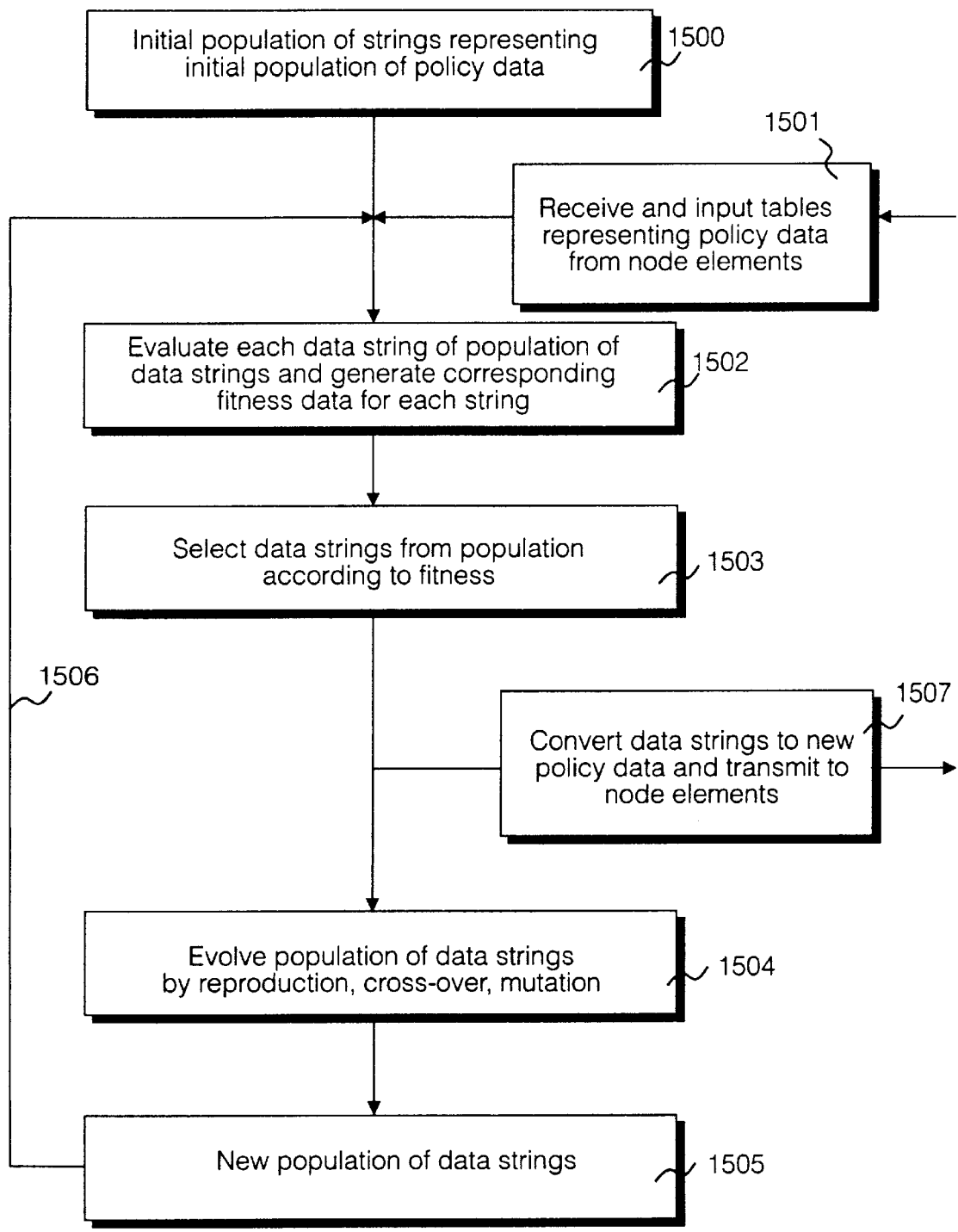
FIG. 15 illustrates schematically a genetic algorithm data processing method operated by the network controller.

Referring to FIG. 15 herein, the genetic algorithm engine commences with an initial population of policy data in step 1500. Each decision table comprising the policy data is represented as a string of bits of data, as shown in FIG. 16. In FIG. 16, the decision tables having threshold values $t_{11}$, $t_{12} \ldots t_{nm}$ are represented as strings of Boolean logic values 0, 1 of fixed length n x m bits for a switch operating n service types and capable of distinguishing m levels of load. The position of the bits of information within the string correspond to the x, y coordinate of the threshold values within the decision table as represented in FIG. 5 herein. In FIG. 16 there is shown a representation of policy data received from each of five switches, the policy data of each switch represented as a string of length nxm bits of Boolean values. Whilst in this example the threshold values $t_{nm}$ are represented as Boolean logic values, the thresholds may be defined as more complex values by representing each threshold as a hexadecimal value. However in the best mode herein the thresholds are represented as Boolean 0 or 1 values.

In step 1500 the initial population comprises strings representing the policy data tables received in step 1501 from the switches on the network, and additionally a set of randomly generated strings, representing randomly generated policy data generated by the network controller. As the genetic algorithm process proceeds, many of the randomly generated strings may be deselected and replaced by new strings.

In step 1502 the population of strings are evaluated and a corresponding fitness data is generated for each string, so that the optimum strings of the population can be selected in step 1503. The selected strings are evolved in step 1504, and the evolved strings form the basis of a new population in step 1505. The new population is then reevaluated in step 1506, re-selected, and re-evolved to form a second generation new population and so on continuously for a predetermined number of populations or until further evolution produces no significant fitness improvement in the population. At predetermined intervals between which, a large number of generations are evolved, the latest current policy data is received from the switches in step 1501. After a predetermined optimization period, comprising a large number of passages through steps 1502–1506, or when no further significant improvement in the population occurs from generation to generation, in step 1507 the selected strings form the basis of the new policy data transmitted to the switches. Steps 1502–1506 operate many times for each operation of steps 1501, 1507 such that between receiving policy data from the switches and transmitting new policy data to the switches, the genetic algorithm engine undergoes many iterations of the genetic process represented in steps 1502–1506.

Figure 17:
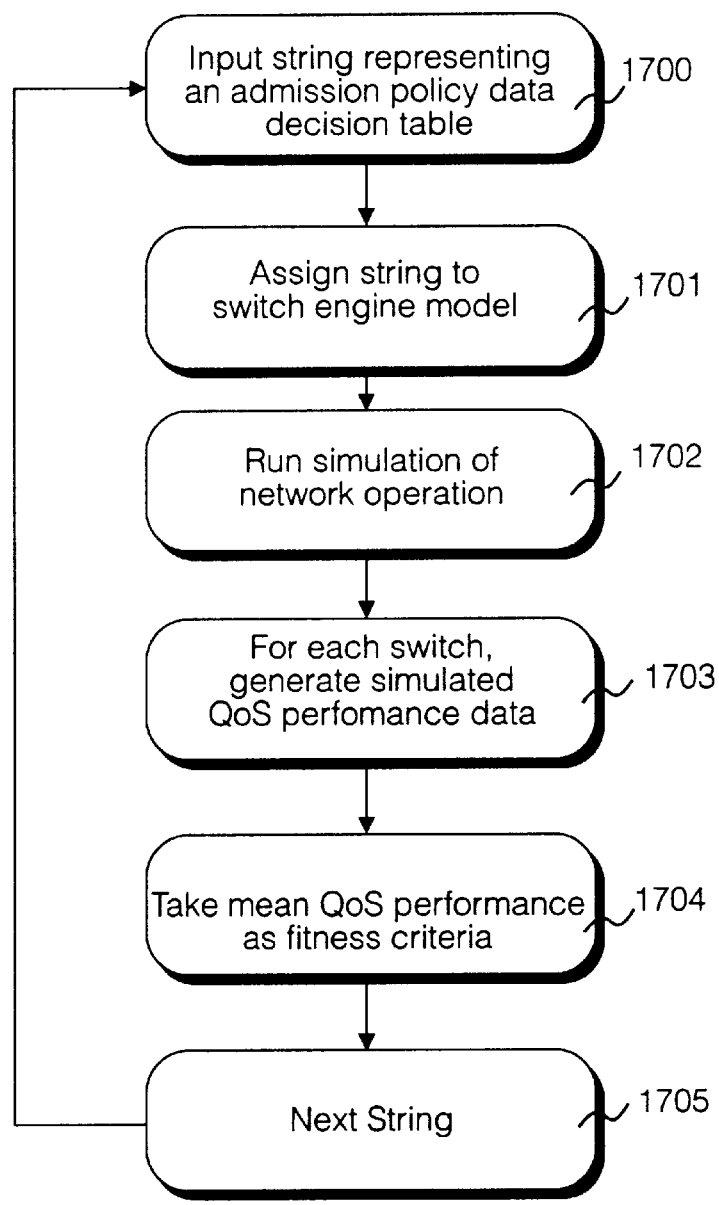
FIG. 17 illustrates schematically a fitness testing data processing method operated by the network controller.

Referring to FIG. 17, there are illustrated steps in the evaluation process 1502 in order to produce a fitness criteria used for string selection in step 1503. In step 1700, the policy data strings representing current policy data received from the switches, initial policy data randomly generated in step 1500 and evolved policy data produced in step 1504 are input one at a time into the simulation engine 807 which simulates operation of each switch in the network. In step 1701 a single string is allocated to each of a plurality of simulated switches. A simulation of operation of the network is performed for the string by operating the simulation engine algorithm in step 1702. In the network simulation, each policy data input as a string from the genetic algorithm engine is applied in a separate step 1701 to each modeled switch, and the simulation models the network operating where each switch operates the same policy data determined by the string. The simulation engine generates a simulated quality of service for each switch operating with the particular policy data selected, where one policy data is applied to all switches at once. In step 1703 the simulation engine calculates a quality of service data for each switch operating the policy data. The simulation engine algorithm models operation of the network as a whole, in electronic form. The switches are represented as node elements linked by link elements in accordance with the network model data 903. Parameters currently applicable to the real network, for example call demand, path utilization which can be read from the management information base are represented in the simulation engine, and the simulation engine may also represent future operation of the network using predicted status parameters, for example predicted call demand and predicted path utilization available from the prediction engine.

An output of the simulation engine is shown in table 3 for a simulated network comprising five simulated switches, where a population comprising X strings are evaluated.

TABLE 3

| String A | Simulated QoS Switch 1 |
| | Simulated QoS Switch 2 |
| | Simulated QoS Switch 3 |
| | Simulated QoS Switch 4 |
| | Simulated QoS Switch 5 |
| String B | Simulated QoS Switch 1 |
| | Simulated QoS Switch 2 |
| | Simulated QoS Switch 3 |
| | Simulated QoS Switch 4 |
| | Simulated QoS Switch 5 |
| String X | Simulated QoS Switch 1 |
| | Simulated QoS Switch 2 |
| | Simulated QoS Switch 3 |
| | Simulated QoS Switch 4 |
| | Simulated QoS Switch 5 |

In step 1503, strings of the population are selected, from which to regenerate the population by evolution. Strings are selected on the basis of a fitness criteria generated for each string in step 1704. A mean simulated quality of service is generated by the simulation engine for each simulated switch, when operated using a particular string. In table 3, each string generates a separate simulated quality of service in relation to each simulated switch. For each string, a fitness measure is taken as an average of the simulated quality of services for each switch. For example, where five switches are represented in the network, the fitness criteria for string A is the average quality of service of the simulated qualities of service generated whilst simulating network performance using string A, for switches S1–S5.

Thus, for a population of X strings there will be X fitness criteria, one per string. The fittest strings may be selected with reference to an average of all X fitness criteria, ie by taking a mean of all X fitness measures and selecting individual strings having the best performance with respect to the means fitness criteria, ie the average of X fitness criteria. However, strings are not necessarily selected as the strings having the best average simulated quality of service data. In order to maintain adaptability within the population, and to avoid convergence of the population to a limited number if sequences of string values, a certain proportion of sub-optimal strings are maintained within the population. Strings may be selected based upon their fitness criteria using a probability function which favors selection of the strings having the best quality of service, but does not completely eliminate strings having sub-optimal quality of service.

In step 1504, the strings are evolved by cross-over, reproduction, and mutation. Techniques for cross-over, reproduction and mutation are well documented in the literature[1]. Briefly, strings are evolved by cross-over by substituting portions of first and second strings with each other. For example the first twelve bits of string A may be substituted for the first twelve bits of string B and vice versa for the first twelve portions of string B. During cross-over, the resultant crossed strings retain a same length n x m values. Strings may also be mutated, by randomly replacing segments or portions of the strings with randomly generated values. Further, strings may be reproduced simply by duplicating a string, or by creating a new string from portions of two or more other strings. Since a proportion of the strings are deselected in the selection step 1503, in order to maintain a population of X strings, new strings need to be introduced by reproduction, to avoid shrinkage of the population of strings. A new generation string population 1505 is input into the simulation engine 807, and steps 1502–1504 are repeated to obtain a second generation population, and so on. Through this process, the population of strings, representing a population of data policies is improved. The evaluation step, which applies the strings to a simulation of the whole network steers the evolved population of strings to a population representing connection and admission policies which improve the performance of the network as a whole. Periodically, the population of strings, representing new policy data is transmitted to the switches in step 1507.

Figure 18:
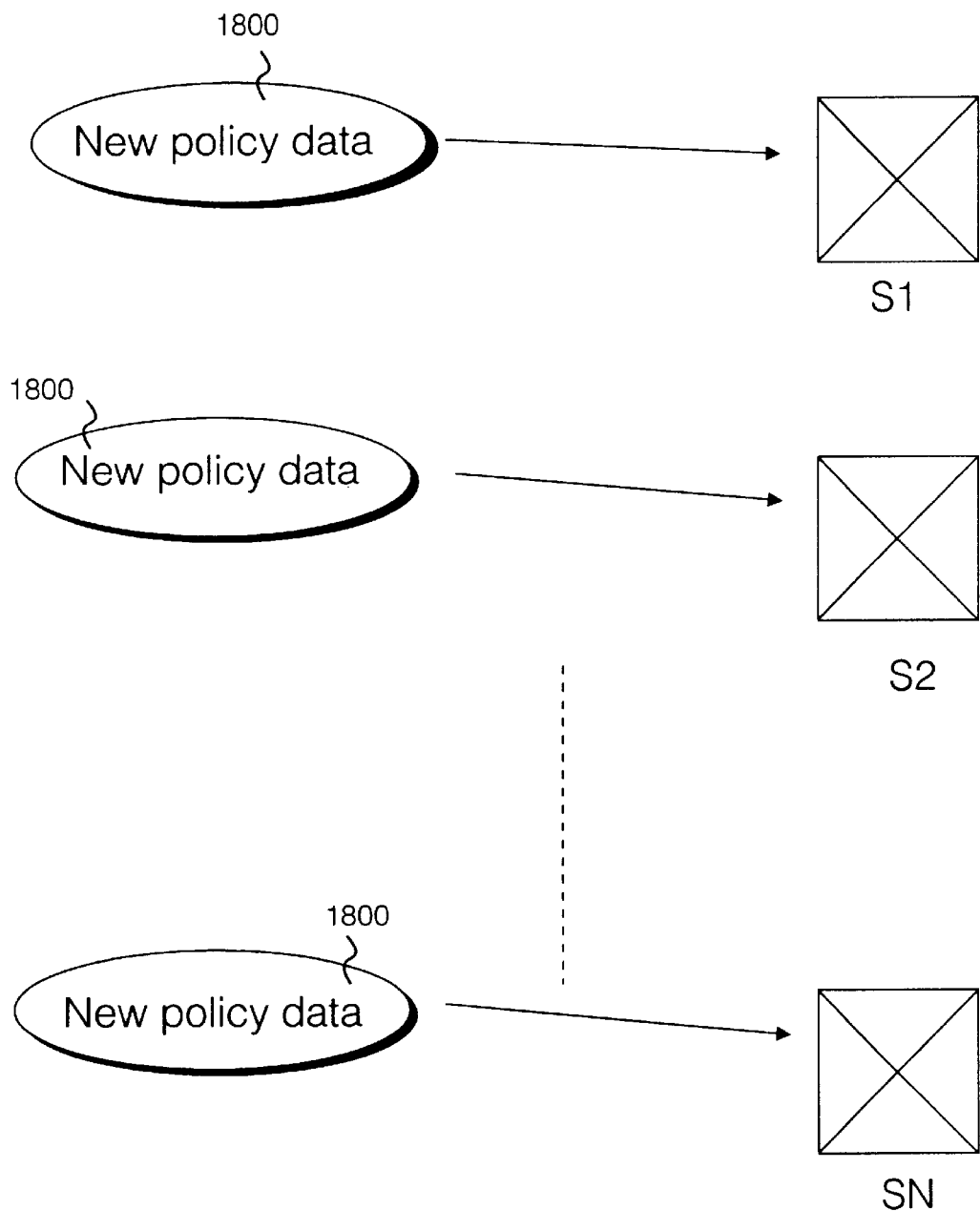
FIG. 18 illustrates schematically flows of data transmitted from the network controller to the node elements of the network.

Referring to FIG. 18, there is shown schematically data transmitted from the network controller to the switches in the network. The network controller transmits new policy data 1800, being either a single decision table, selected as the optimum decision table by the process of FIG. 15, or a set of a small number of decision tables representing a sample of the optimum strings produced by the genetic algorithm.

Figure 19:
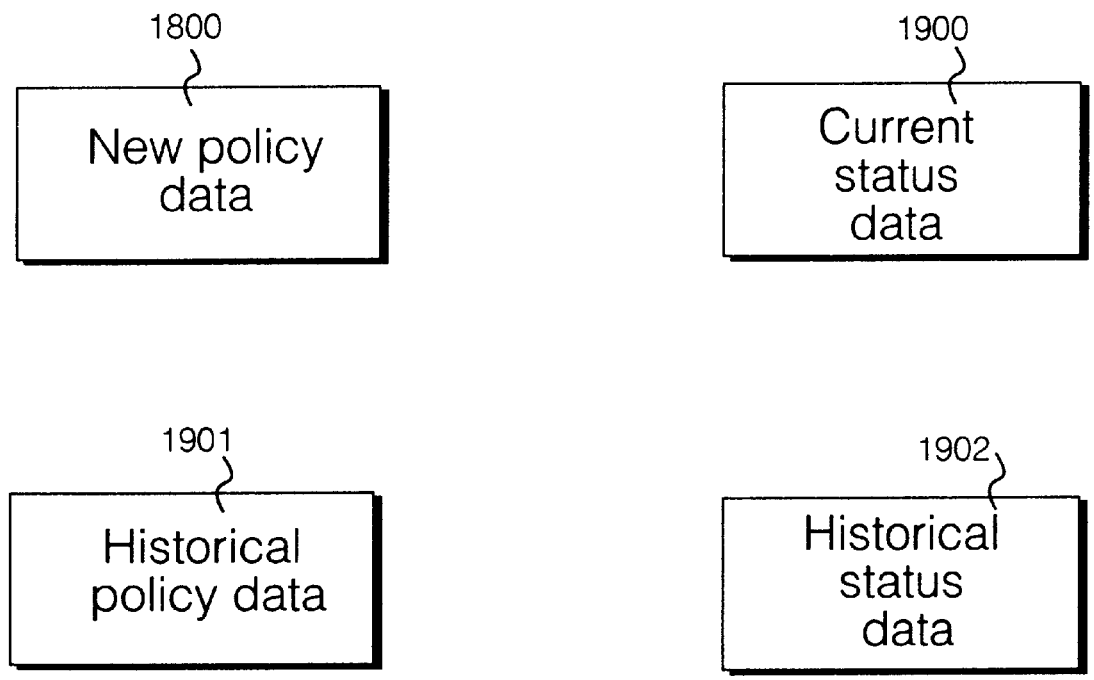
FIG. 19 illustrates an arrangement of data within a node element of the network.

Referring to FIG. 19 there is shown schematically data stored at each of the switches of the network. As the switch implements the newly received policy data as its current policy data, the switch generates a current performance data 1900 corresponding to quality of service provided by the switch. In addition to the new policy data 1800, the switch stores historical policy data 1901. The historical policy data comprises previous decision tables which have been implemented by the switch. For each historical policy data stored, a corresponding historical quality of service data 1902 is stored by the switch, so that the switch keeps a record of its previous decision tables implemented, along with the quality of service performance which those decision tables gave rise to when they were implemented by the switch. On receipt of the new policy data from the network controller, the switch over-writes a previous policy data with the new policy data, maintaining a total of M decision tables in all at the switch. Where the new policy data 1800 comprises a single decision table, the switch implements that decision table upon receipt from the network controller. Where the new policy data comprises a set of decision tables the switch may select a decision table in the new policy data and implement it for a predetermined period as its currently active policy data.

Since the switch operates in real time, to avoid catastrophic failure of the network in the event that the network controller generates new policy data decision tables which are significantly worse than the policy data being implemented throughout the network, each switch can take local control in selecting the policy data which it implements. The switch may operate the new policy data 1800 for a predetermined period, and if the resultant quality of service obtained from operating that policy data is poor compared to historical quality of service data 1902, the switch may take local control of the policy data being implemented and select an historical decision table previously used, which gave rise to a quality of service data better than that arising from implementation of the new decision table received from the network controller.

A new decision table issued by the network controller may provide improved quality of service for some switches in the network, but may cause degraded performance for other switches in the network. Those switches encountering reduced performance compared to previous performances may override the policy data issued by the network controller, substituting a policy data selected from their own stored set of historical decision tables, in order to locally provide a better quality of service than is available using the new policy data supplied from the network controller. Subsequently, when the switches transmit their current decision tables back to the network controller in step 1501, any decision tables which have overridden a decision table issued previously by the network controller are reintroduced into the population of strings being evolved by the genetic algorithm engine. Thus, as there is feed back in the form of decision tables which are actually used in the real network, effects on policy due to disparity between the network model operated in the simulation engine and the real network and its operation are periodically corrected though the mechanism of collection of current decision tables from the switches. Further, the genetic algorithm engine and simulation engine may be kept up to date with traffic conditions in the real network, through the feedback mechanism input of the current parameter data from the management information base of the network controller, which incorporates information concerning actual traffic conditions, eg demand and utilization throughout the network.

Figure 20:
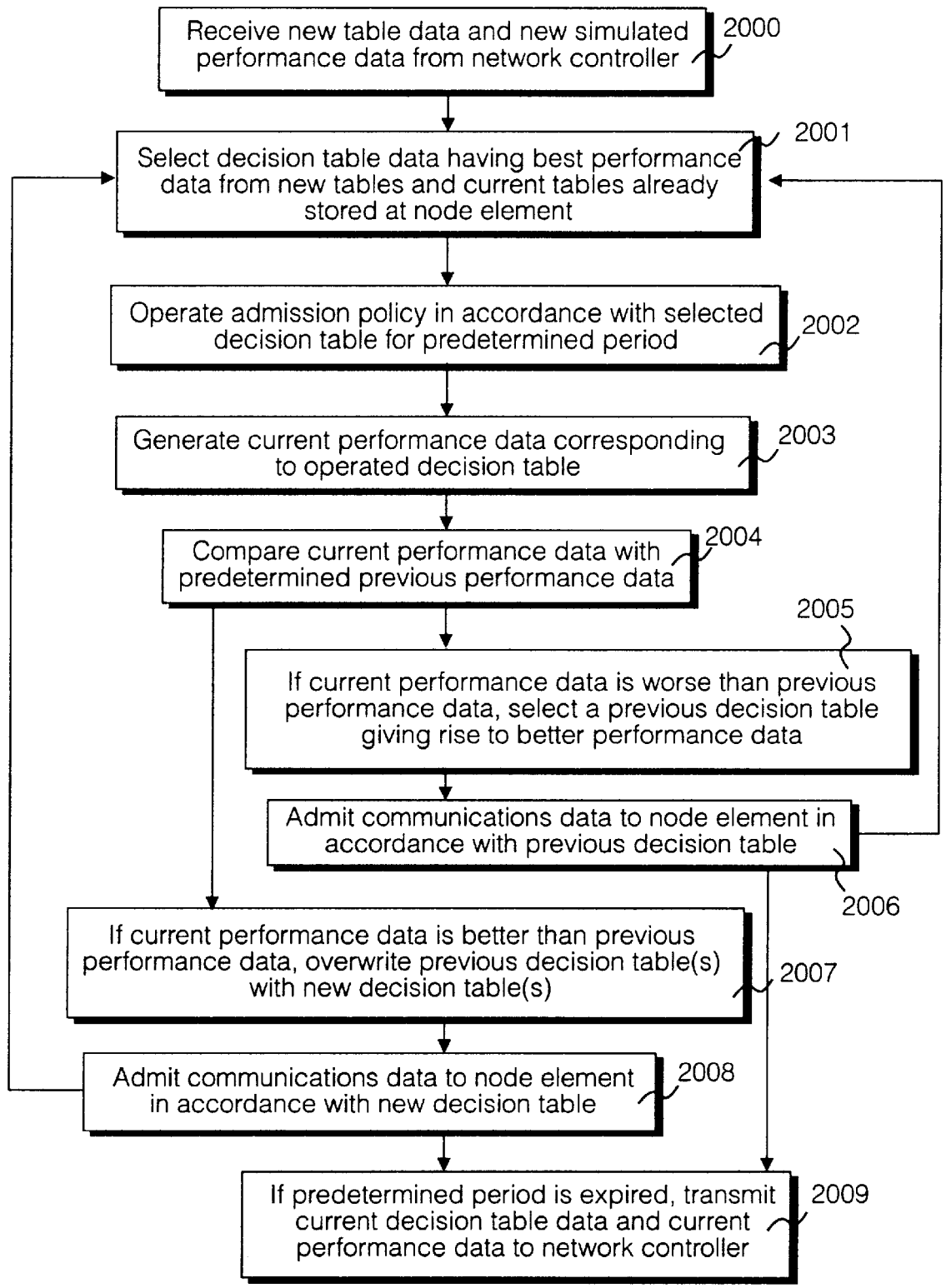
FIG. 20 illustrates schematically data processing steps implemented at each node element, the data processing steps comprising a method for controlling admission of communications signal data to the node element, and comprising a method of generating an admission control policy data for controlling transmission of communications traffic data over the network.

Referring to FIG. 20 herein there are summarized operational steps implemented at each switch. In step 2000 each switch receives the new policy data from the network controller. The switch operates the new policy data, and periodically selects the decision table resulting in the best corresponding quality of service performance data from the new tables and historical tables stored at the switch in step 2001. The switch then proceeds to operate the selected decision table for a predetermined period in step 2002, generating a current quality of service performance data in step 2003 corresponding to the currently operated decision table. In step 2004, the switch periodically compares the current quality of service performance data with previous quality of service performance datas obtained using other decision tables. In step 2005 if the current quality of service performance data is worse than a previous historical quality of service performance data, the switch selects a previous decision table having a better quality of service data than the currently operated decision table and proceeds to implement that policy in step 2006. The switch may select an as yet untried decision table from the new policy data. However, if the current decision table gives rise to a current quality of service performance data which is better than previous quality of service performance in step 2007 the switch overwrites a previous historical decision table having a lower quality of service data with the current decision table and proceeds to implement that policy in step 2008. By this mechanism, the switch discards the lower performing decision tables and maintains a set of new policy data and historical policy data which is a selection of the best decision tables which the switch has operated. After a predetermined operational period, in step 2009 the switch transmits its currently operating decision table to the network controller, optionally together with is current quality of service performance data. The information transmitted in step 2009 comprises the data input in steps 1002 and 1501.

In the best mode herein, development of connection admission control policies is undertaken at a local level at each switch, distributed across the network, by local operation of policies by each switch, and at a network-wide level at a centralized network controller by developing an overall optimized policy data using genetic algorithm or other like optimization techniques.

Whist the best mode herein has been described with reference to asynchronous transmission mode (ATM) networks, the invention is not restricted to asynchronous transmission mode, but encompasses transmission control protocol/internet protocol, synchronous digital heirachy, synchronous optical network, Groupe Systeme Mobile networks, and communications networks in general, which comprise a plurality of node elements linked by a plurality of link elements.

References

[1] David E Goldberg. *Genetic Algorithms in Search Optimization and Machine Learning.* Addison Wesley, 1989, ISBN 0201 157675

We claim:

1. A method of controlling admission of communication signal data over a communications network comprising a plurality of node elements linked by a plurality of link elements, said method comprising the steps of:

collecting a plurality of admission control policy data each relating to an admission control policy for admitting communications traffic data to a said node element;

determining a new admission control policy data from said plurality of collected current admission control policy data, wherein said step of determining comprises generating a simulated performance data from said new admission control policy data; and operating said new admission control policy data at said plurality of node elements.

2. A method as claimed in claim 1, wherein said collected plurality of admission control policy data includes current admission control policy data currently operated by at least one said node element.

3. A method as claimed in claim 1, further comprising the steps of:

collecting a plurality of performance data, each relating to a performance of a respective node element; and determining said new admission control policy data from said plurality of collected performance data.

4. A method as claimed in claim 3, wherein said collected plurality of performance data includes current performance data relating to a current operation of a said node element.

5. A method as claimed in claim 1, wherein said step of operating said new admission control policy data at each of said plurality of node elements comprises:

at each node element;

comparing a current performance data describing a current performance of said node element with a predetermined performance data; and if said current performance data is worse than said predetermined performance data, operating a previous said admission control policy data.

6. A method as claimed in claim 1, wherein said step of determining a new admission control policy data comprises:

representing said plurality of admission control policy data as input data to an optimization algorithm; and operating said optimization algorithm to optimize said input admission control policy data.

7. A method a claimed in claim 1, wherein said step of determining a new admission control policy data comprises:

representing said plurality of admission control policy data as a population of data strings; and evolving said population of said data strings to produce a new population of data strings representing a new set of admission control policy data.

8. A method as claimed in claim 1, wherein said step of operating new admission control policy data at said plurality of node elements comprises operating said new admission control policy for a predetermined period.

9. A communications network comprising:

a plurality of node elements and a plurality of link elements; and an admission control policy data generator for generating an admission control policy data for controlling admission of communications traffic data to the network, said admission control policy data generator further comprising:

a processor element for processing said admission control policy data, said processor element configured for operating to: input a population of data strings corresponding to a population of admission control policy data; evaluate said population of data strings; select individual data strings of said population in accordance with the result of said evaluations; and evolve said selected data strings to create a new population of data strings corresponding to a new population of admission control policy data; and wherein:

each said node element admits input traffic data in accordance with an admission control policy data stored locally at said node element;

each said node element periodically transmits said admission control policy data to said admission control policy data generator; and said admission control policy data generator operates to generate a new admission control policy data depending on a plurality of said admission policy data received from said plurality of node elements.

10. A method of implementing transmission of communications signal data over a communications network comprising a plurality of node elements connected by a plurality of link elements, said method comprising the steps of:

admitting communications data to each node element in accordance with a set of admission control policy data;

generating a respective performance data at each node element, said performance data describing a performance of said node element;

collecting said performance data corresponding to a plurality of said node elements; and generating new admission control policy data depending on said collected performance data, wherein said step of generating new admission control policy data comprises generating a simulated performance data from said new admission control policy data.

11. A method of generating an admission control policy data for controlling transmission of communications traffic data over a communications network comprising a plurality of node elements linked by a plurality of link elements, said method comprising the steps of:

representing a plurality of admission control policy data as a population of data strings;

evolving said population of data strings by data processing operations selected from the set of reproduction, cross-over and mutation, to obtain an evolved population of data strings;

generating a respective fitness data corresponding to each said string data; and selecting one or a plurality of data strings of said evolved population in accordance with said fitness data, said selected strings comprising a next generation population of data strings.

12. A method as claimed in claim 11, wherein said step of generating a fitness data comprises:

obtaining a respective admission control policy data corresponding to each said string data; and processing each said admission control policy data in accordance with a network simulation model data to obtain a respective simulated performance data corresponding to each said string data; and obtaining said fitness data from said simulated performance data.

13. A method as claimed in claim 11, comprising the steps of:

selecting an optimum set of string data based on a result of said fitness data;

for each string data of said optimum set, obtaining a respective admission control policy data resulting in a set of new admission control policy data;

transmitting said set of new admission control policy data to a plurality of node elements configured to operate in accordance with said admission control policy data;

generating a respective performance data at each node element, each said performance data describing a performance of said respective node element; and obtaining a said fitness data from said generated performance data.

* * * * *